US008332854B2

(12) United States Patent
Kinsey

(10) Patent No.: US 8,332,854 B2
(45) Date of Patent: Dec. 11, 2012

(54) VIRTUALIZED THREAD SCHEDULING FOR HARDWARE THREAD OPTIMIZATION BASED ON HARDWARE RESOURCE PARAMETER SUMMARIES OF INSTRUCTION BLOCKS IN EXECUTION GROUPS

(75) Inventor: Jeffrey Kinsey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 497 days.

(21) Appl. No.: 12/468,301

(22) Filed: May 19, 2009

(65) Prior Publication Data

US 2010/0299671 A1   Nov. 25, 2010

(51) Int. Cl.
*G06F 9/46* (2006.01)
(52) U.S. Cl. .................. 718/102; 718/104; 718/100
(58) Field of Classification Search .................. None
See application file for complete search history.

(56) References Cited

U.S. PATENT DOCUMENTS

| 7,191,440 | B2 | 3/2007 | Cota-Robles et al. | |
|---|---|---|---|---|
| 7,448,037 | B2* | 11/2008 | Arimilli et al. | 718/104 |
| 7,996,346 | B2* | 8/2011 | Bell et al. | 718/102 |
| 2004/0199919 | A1 | 10/2004 | Tovinkere | |
| 2007/0033592 | A1* | 2/2007 | Roediger et al. | 718/102 |
| 2007/0150898 | A1 | 6/2007 | Duda et al. | |
| 2008/0229321 | A1* | 9/2008 | Krieger et al. | 718/104 |
| 2008/0250233 | A1 | 10/2008 | Marden et al. | |
| 2009/0007121 | A1 | 1/2009 | Yamada et al. | |
| 2011/0126200 | A1* | 5/2011 | Krieger et al. | 718/102 |

OTHER PUBLICATIONS

Blair, L. Eric, "Impact of Thread Priority on .NET Applications and Hyper-Threading Enabled Processors", Retrieved at <www.developers.net/intelisnshowcase/view/310>>, Feb. 11, 2009, pp. 1-2.
Cockroft, Adrian, "Performance Monitoring with Hyperthreading", Retrieved at <<perfcap.blogspot.com/2005/05/performance-monitoring-with.html>>, May 20, 2005, pp. 1-4.
Finger, Roger, "Hyperthreading Technology and Digital Multimedia", Retrieved at <//www.osnews.com/story/2962/Hyperthreading_Technology_and_Digital_Multimedia/page3/>>, Mar. 4, 2003, pp. 1-7.
Celebioglu, et al., "The Performance Impact of Computational Efficiency on HPC Clusters with Hyper-Threading Technology", Proceedings of the 18th International Parallel and Distributed Processing Symposium, Retrieved at <ieeexplore.ieee.org/ielx5/9132/28950/01303311.pdf?arnumber=1303311&htry=1>>, Apr. 26-30, 2004, pp. 6.
Halloway, Stuart"JDC Tech Tips: Mar. 28, 2000", Retrieved at <java.sun.com/developer/TechTips/2000/tt0328.html>>, Mar. 28, 2000, pp. 1-3.

* cited by examiner

*Primary Examiner* — Meng An
*Assistant Examiner* — Bing Zhao
(74) *Attorney, Agent, or Firm* — Alleman Hall McCoy Russell & Tuttle LLP

(57) ABSTRACT

Embodiments are disclosed herein related to scheduling of virtualized runtime threads to hardware threads that share hardware resources to improve processing performance. For example, one embodiment provides a computing system that includes a scheduler to schedule execution of virtualized source code. The virtualized source code may include virtualized runtime threads that may be scheduled by the scheduler onto hardware threads that share hardware resources. The scheduler may include a decoder to catalogue hardware resource parameters used by the virtualized source code. Furthermore, the scheduler may include a virtualization engine to schedule execution of the virtualized runtime threads onto the hardware threads based the hardware resource parameters and a hardware-specific profile of the computing system.

17 Claims, 3 Drawing Sheets

VIRTUALIZED THREAD SCHEDULING FOR HARDWARE THREAD OPTIMIZATION BASED ON HARDWARE RESOURCE PARAMETER SUMMARIES OF INSTRUCTION BLOCKS IN EXECUTION GROUPS

BACKGROUND

A processor may execute a hardware thread using local memory and execution units such as floating point units, integer units, vector units, and branch units. A single hardware thread executing on the processor cannot normally keep all execution units busy, as bottlenecks occasionally develop. Thus, in a process referred to as concurrent multithreading (also referred to herein as "concurrent multithreading"), some processors utilize two or more hardware threads, to provide the ability to execute operations in parallel. By scheduling software threads to run on the hardware threads in a manner that minimizes competition between the hardware threads for the local memory and execution units of the processor, a developer may create code that executes efficiently. The process of creating such code that executes efficiently for a given processor architecture may be referred to as processor optimization of the code.

A problem may occur when code that has been processor optimized for a target processor architecture is run in a virtual machine environment on a different processor architecture. The number of processors and processor cores, the amount of local memory, and the type, number, and configuration of execution units may vary in different processor architectures. Therefore, code that has been processor-optimized for a target processor architecture may fail to achieve intended efficiency gains, and instead may end up running slower in a virtual machine environment on a different processor architecture. Such a decrease in performance may result in a degraded user experience, particularly for processor intensive tasks, such as graphics processing.

SUMMARY

Accordingly, various embodiments are disclosed herein that relate to scheduling execution of virtualized source code to hardware threads that share hardware resources to improve processing performance. For example, one embodiment provides a computing system that includes a scheduler to schedule execution of virtualized source code. The virtualized source code may include virtualized runtime threads that may be scheduled by the scheduler onto hardware threads that share hardware resources. The scheduler may include a decoder to catalogue hardware resource parameters used by the virtualized source code. Furthermore, the scheduler may include a virtualization engine to schedule execution of the virtualized runtime threads onto the hardware threads based on the hardware resource parameters and a hardware-specific profile of the computing system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure is directed to the efficient execution in a virtual machine environment of source code originally developed for execution on different or undetermined processor architecture. A computing system is disclosed that comprises one or more processors, each processor being configured to execute in parallel at least two hardware threads that share hardware resources of the processor. The computer system is configured to catalogue hardware resource parameters used by virtualized runtime threads of the source code, for example, to track how often various hardware resources are predicted to be used by a given virtualized runtime thread. The execution of the virtualized runtime threads may be scheduled to different hardware threads based on such tracking so that the hardware resources being used by the virtualized runtime threads do not create bottlenecks in the processing pipeline of the processor.

Figure 1:
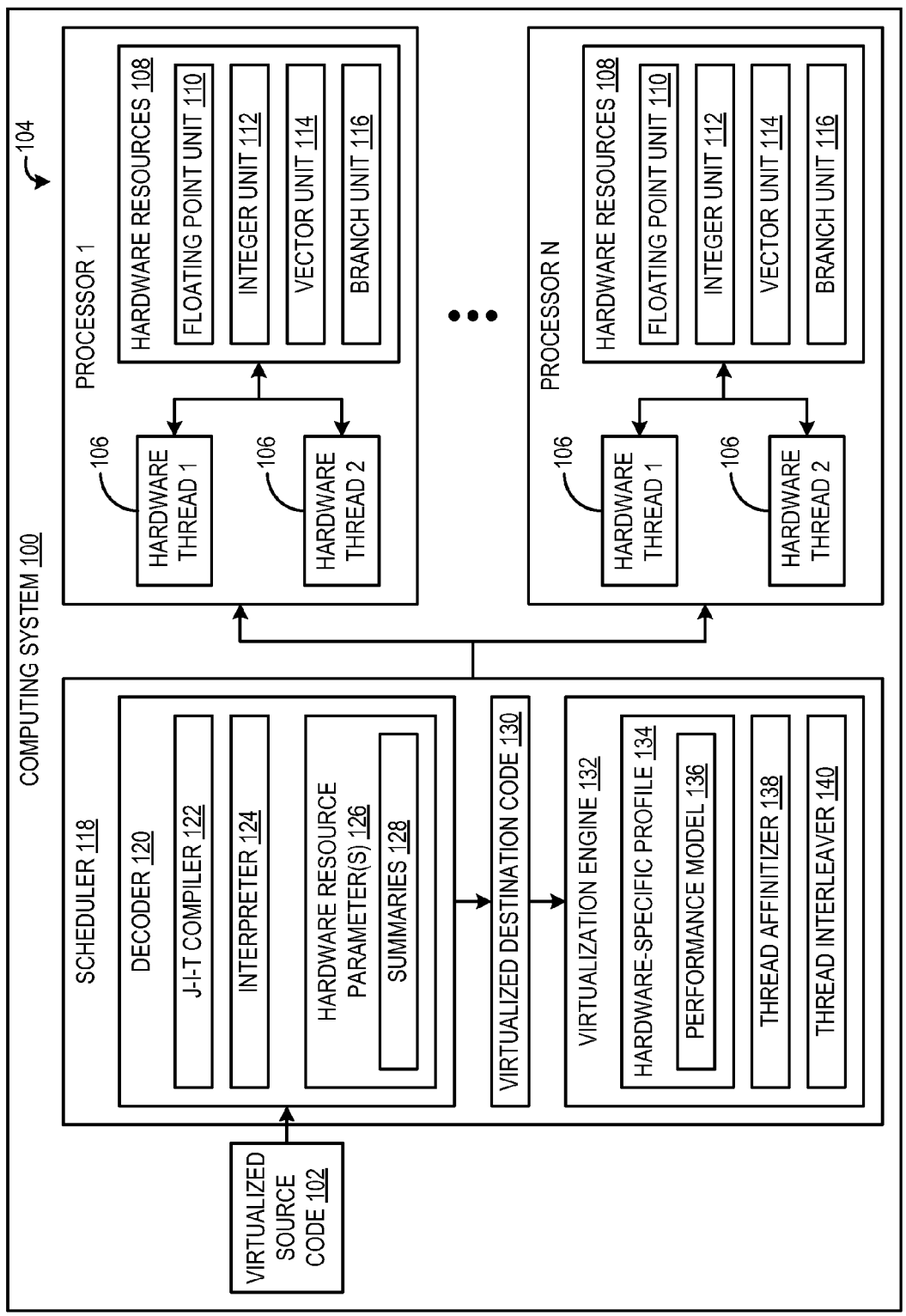
FIG. 1 is a schematic diagram of an embodiment of a computing system in which virtualized runtime threads may be scheduled for execution onto one or more hardware threads that share hardware resources.

FIG. 1 is a schematic diagram of a computing system 100 in which a virtual machine architecture may be implemented to execute virtualized source code 102. As discussed herein, "virtualized source code" may be defined to either be human readable virtualized code or machine readable virtualized code, as appropriate depending on the application. The computing system 100 may comprise one or more processor(s) 104, each having a plurality of hardware threads to execute runtime threads. A hardware thread 106 may use hardware resources 108 of a corresponding processor 104 to execute various instructions of the runtime threads. Examples of hardware resources 108 that may be used by hardware thread 106 to execute an instruction may include a floating point unit 110, an integer unit 112, a vector unit 114, and a branch unit 116. Other embodiments may include subcombinations of the types of hardware resources described herein, and/or may include other suitable types of hardware resources for performing computations and/or holding data.

Processor 104 may be a multi-core processor including processors 1-N corresponding to each core of the multi-core processor 104. Each of processors 1-N is configured to execute at least two hardware threads that may act as virtual processors. In other words, an operating system of the computing system may view each physical processor as two virtual processors, and the processing workload of the processor may be shared between the two virtual processors. The two hardware threads may facilitate concurrent execution of runtime threads by the processor to improve processing performance via parallelization. However, since the two hardware threads run on the one processor, the hardware resources of the processor are shared between the two hardware threads, as discussed below. In order to optimize the processing performance of the hardware threads via concurrent multithreading, virtualized source code is configured so that virtual runtime threads being executed concurrently do not attempt to use the same hardware resources concurrently. Otherwise, bottlenecks may occur, and virtualized execution may be slowed.

It will be appreciated that any suitable processor configuration that employs parallelized hardware threads may be implemented in the computing system. In some embodiments, hardware threads may share all hardware resources of a processor while in other embodiments, the hardware threads may only share some hardware resources of the processor.

Due to the nature of virtualization, the source code may be indeterministic. As such, in some cases, the virtualized source code may be optimized for execution on a specific hardware configuration that is different than the hardware configuration of computing system 100. Steps that may be taken in optimization include specifying that particular threads be scheduled on the same processor (processor affinity), or utilize the same hardware resources. When executed in a virtual machine environment on a different processor architecture, however, such optimization can result in inefficient processing, both due to the different processor architecture and due to the effects of virtualization. Further, the specific hardware configuration for which the source code was optimized may be undetermined by computing system 100, and thus the intended optimization may be difficult or impossible to programmatically recreate. As a result, in some cases, such optimization may cause execution to be slowed if the source code as received were to be executed by computing system 100.

For example, the virtualized source code may be optimized to be executed by a processor that does not implement hardware threads. Accordingly, the virtualized source code may have virtualized runtime threads that may include instructions that request use of the same hardware resources, since the virtualized source code assumes that hardware resources are not shared. If computing system 100 were to execute the virtualized source code using concurrent multithreading via two hardware threads of the same processor, the same hardware resources may be requested at the same time, which may result in slowed operation of the virtualized source code.

As another example, the original source code may have been optimized to be executed by a processor architecture that has a different number of processor cores, or a different configuration of execution units within each core. This may result in underutilized and overutilized cores, or bottlenecks among the execution units within each core, thereby slowing operation of the virtualized source code.

The computing system 100 includes a scheduler 118 that may be configured to translate virtualized source code 102 so that it is optimized for execution by hardware threads 106 of computing system 100. The scheduler 118 may comprise a decoder 120 that receives virtualized source code 102. The decoder 120 may be configured to translate virtualized source code 102 into virtualized destination code 130. In other words, virtualized source code 102, which may be optimized for an undetermined processing architecture, may be translated and optimized for execution by the processing architecture of computing system 100. The translation process may optimize the source code for execution on a plurality of parallel hardware threads via concurrent multithreading.

In some embodiments, decoder 120 may comprise a just-in-time (J-I-T) compiler 122 to translate virtualized instructions to physical instructions, at run time. In other embodiments, decoder 120 may comprise an interpreter 124 to translate virtualized instructions to physical instructions, prior to run time. In some embodiments, the decoder may comprise a combination of J-I-T compiler 122 and interpreter 124 to translate virtualized instruction to physical instructions, both prior to run time and again at run time.

The virtualized source code 102 may comprise a plurality of virtualized runtime threads that further comprise a plurality of instructions blocks (e.g., including 64 instructions per block). The decoder 120 may be configured to perform the translation at a block level. In particular, decoder 120 may be configured to catalogue one or more hardware resource parameters 126 used by instructions of virtualized source code 102. These hardware resource parameters 126 may track which hardware resources 108 of processor(s) 104 are used by the virtual instructions of each virtualized runtime thread of virtual source code 102.

The hardware resource parameters 126 may include Boolean parameters that track use of one or more of hardware resources 108. A Boolean parameter may indicate whether or not the hardware resource was used by an instruction, used in an instruction block, used in a thread, etc. In other words, the hardware resource may be used to determine that one or more selected hardware units are used by a selected virtualized runtime thread of the plurality of virtualized runtime threads of the virtualized source code.

The hardware resource parameters 126 may include complex parameters, such as a scalar parameter that tracks use of one or more of hardware resources 108. For example, the complex parameter may be a counter that tracks how many times a hardware resource was used in an instruction block, a thread, etc. In other words, the hardware resource parameter may be used to determine a number of times one or more selected hardware units are used by a selected virtualized runtime thread of the plurality of virtualized runtime threads. As another example, the complex parameter may track how much memory/cache is used to execute an instruction, an instruction block, and/or a thread. In other words, the hardware resource parameter may be used to determine an amount or bandwidth of memory used to execute a selected virtualized runtime thread. In some cases, different types of memory may be tracked or an amount/bandwidth that is used by instruction(s) may be determined for one or more of the different types of memory. Examples of different types of memory that may be tracked may include system memory, cache memory (e.g., L1 through L3), register files, local heaps, etc. As yet another example, the complex parameter may track how long it would take to execute an instruction, block, and/or a virtualized runtime thread.

In some embodiments, the hardware resource parameters 126 may be catalogued using a data structure. For example, a data structure including a Boolean object and a counter object may be created for each hardware resource. The data structure may track whether or not the hardware resource was used by an instruction, an instruction block, and/or a virtualized runtime thread, as well as how many times the resource was used in an instruction block, and/or a virtualized runtime thread.

The cataloguing may be performed at the time of decoding or compiling and may be kept for each instruction block. At runtime, the catalogued resource parameters 126 may be collected and aggregated across all the instruction blocks. The cataloged resource parameters 126 may indicate whether a hardware resource is used frequently or infrequently in a block, and/or a virtualized runtime thread.

The decoder 120 may be configured to create a summary 128 of catalogued hardware resource parameters 126 for each instruction block of the plurality of instruction blocks. The summary 128 may define which hardware resources are used by the instruction block as well as how often the hardware resources are used by the instruction block. Further, during translation decoder 120 may be configured to group instruction blocks into execution groups according to corresponding summaries of the catalogued hardware resource parameters. For example, instruction blocks that use the same or similar hardware resources may correspond and thus may be grouped together into an execution group. The execution groups of instruction blocks may facilitate predictable use of the hardware resources of a processor which may facilitate more efficient scheduling of virtualized runtime threads and improved processing performance.

The decoder 120 may provide virtualized destination code 130 that has been translated from the virtualized source code 102 to a virtualization engine 132. The virtualized destination code 130 includes a plurality of virtualized runtime threads, each of which include execution groups of instruction blocks that have summaries indicating that they use the same or similar hardware resources. The instruction block may be organized into execution groups so as to reduce the likelihood of two hardware threads using the same shared hardware resource at the same time during execution of the virtualized destination code via concurrent multithreading by computing system 100. The virtualization engine 132 may be configured to schedule execution of each of the plurality of virtualized runtime threads of virtualized destination code 130 onto one or more hardware threads 106 based on one or more hardware resource parameters 126 and a hardware-specific profile 134 of computing system 100.

The hardware-specific profile 134 may define the hardware resources of a processor and may enable virtualization engine 132 to know what hardware resources of a processor are shared between hardware threads. Each different type of processor may have a profile that is specific to that processor, since each processor has different performance characteristics. Further, hardware-specific profile 134 may include a model 136 of hardware-specific performance characteristics of hardware resources 108 of processor 104 used by the hardware threads 106. For example, a performance characteristic may include hardware specific execution times for instructions executed by the virtualized source/destination code. For example, the model may indicate that a vector divide instruction may be less efficient than (e.g., take longer than) a vector add instruction based on the performance characteristics of the processor. As another example, the model may indicate that a branch instruction is more efficient than (e.g., take less time) a vector add instruction based on the performance characteristics of the processor.

The virtualization engine 132 may reference performance model 136 to schedule non-conflicting or complimentary virtualized runtime threads, that is, threads that have instructions which use different hardware resources when executed by hardware threads that share hardware resources. In some cases, virtualization engine 132 may be configured to schedule execution of each of the plurality of virtualized runtime threads onto hardware threads based on the execution groups of the virtualized runtime threads. Accordingly, virtualization engine 132 may be configured to schedule execution of corresponding virtualized runtime threads such that virtualized runtime threads having execution groups that use the same hardware resources are not executed by hardware threads that share those same hardware resources.

On a periodic basis, virtualization engine 132 may review incoming virtualized runtime threads of virtualized destination code 130 against hardware-specific profile 134 to check for conflicts in shared hardware resources. If a conflict in shared hardware resources is found, for example due to a new execution group being executed that uses a different hardware resource, virtualization engine 132 may be configured to schedule the conflicting virtualized runtime thread to a different non-conflicting hardware thread if possible so as to not create bottlenecks on the shared hardware resources used by the hardware threads.

In some embodiments, virtualization engine 132 may include a thread affinitizer 138 that may be configured to schedule execution of a plurality of virtualized runtime threads by changing a processor affinity of one or more of the plurality of virtualized runtime threads to a non-conflicting hardware thread. The thread affinitizer 138 may be implemented in computing system application where there is at least enough hardware threads to handle the execution of the virtualized runtime threads, such as in a computing system that includes a plurality of processor cores capable of performing concurrent multithreading via hardware threads that share hardware resources.

In some embodiments, virtualization engine 132 may include a thread interleaver 140 that may be configured to schedule execution of a plurality of virtual runtime threads by interleaving two or more of the plurality of virtual runtime threads onto a selected hardware thread of the one or more hardware threads. In particular, thread interleaver 140 may schedule a certain amount of one or more virtualized runtime thread on a particular hardware thread for execution and then may repeatedly switch the one or more virtualized runtime threads to different hardware threads as the virtualized destination code is executed.

Figure 2:
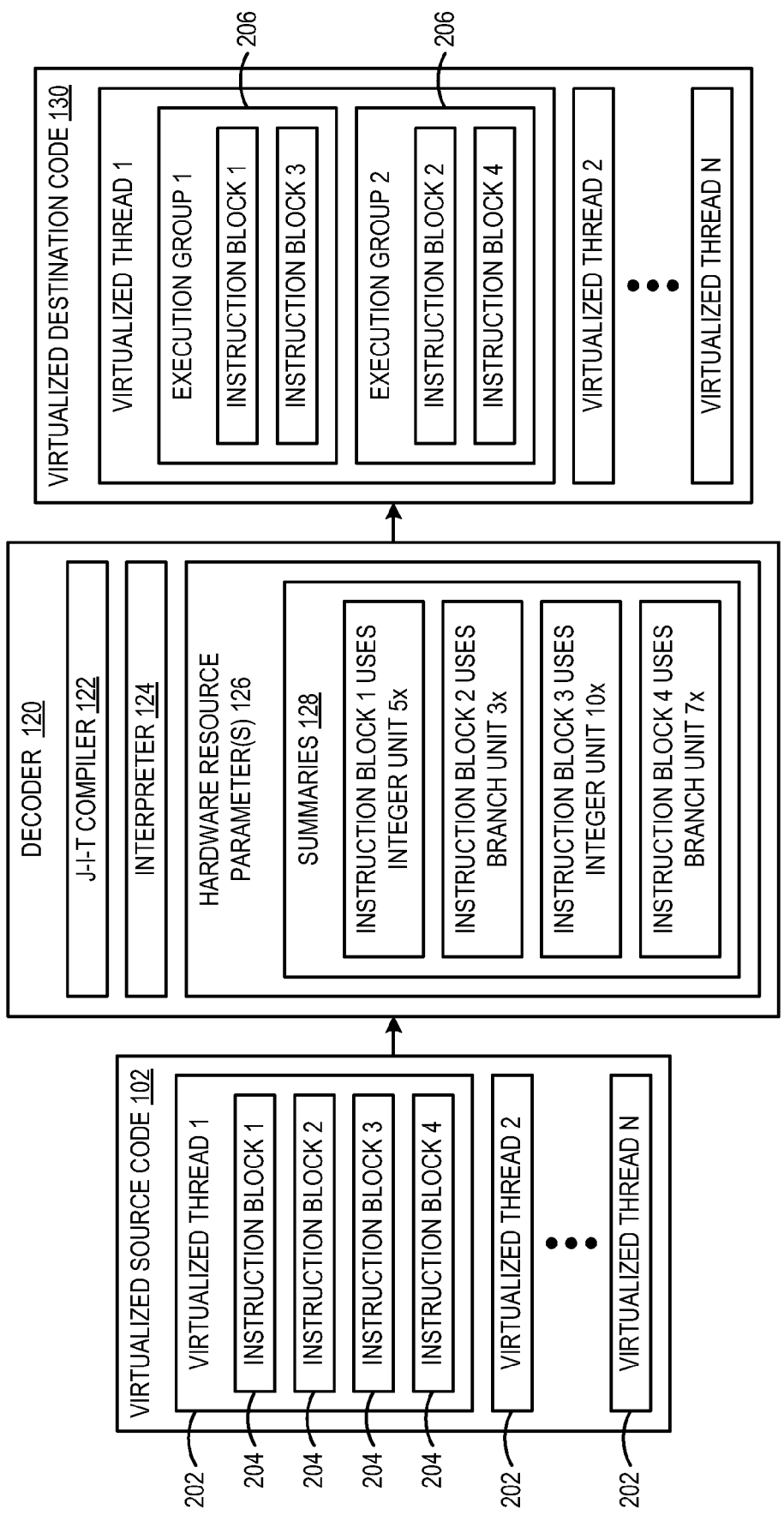
FIG. 2 is a schematic diagram of an embodiment of a decoder to translate virtualized source code into virtualized destination code.

FIG. 2 is a schematic diagram of an embodiment of a decoder 120 to translate virtualized source code 102 into virtualized destination code 130 that may be optimized for scheduled execution on hardware threads that share hardware resources of a processor. The virtualized source code 102 may include a plurality of virtualized runtime threads 202 (e.g., virtualized threads 1-N). Each of the plurality of virtualized runtime threads 202 may include a plurality of instruction blocks 204 (e.g., blocks 1-4). Each of the plurality of instruction blocks may include a plurality of virtual instructions to be executed. The decoder 120 may translate the virtualized source code 102 for execution by processor(s) 104 of computing system 100 (Shown in FIG. 1). In some cases, translation may be performed by J-I-T compiler 122. In some cases, translation may be performed by interpreter 124.

During translation, decoder 120 may collect information about each of the instruction blocks of virtualized source code 102. In particular, decoder 120 may catalogue hardware resource parameters 126 used by each virtual instruction. The catalogued hardware resource parameters 126 may be aggregated at the instruction block level to create a summary 128 for each instruction block that defines the hardware resource usage of that instruction block.

For example, in the illustrated embodiment, summaries are shown that catalog the hardware resource usage of instruction blocks in virtualized runtime thread 1. In particular, a summary corresponding to instruction block 1 indicates that an integer unit is used five times during execution of instruction block 1. Further, a summary corresponding to instruction block 2 indicates that a branch unit is used five times during execution of instruction block 2. Further still, a summary corresponding to instruction block 3 indicates that an integer unit is used ten times during execution of instruction block 3. Further still, a summary corresponding to instruction block 4 indicates that a branch unit is used seven times during execution of instruction block 4.

The decoder 120 may be configured to organize instruction blocks 204 into execution groups 206 based on corresponding summaries of the catalogued hardware resource parameters. In other words, instruction blocks 204 may be grouped into execution groups 206 based on like usage of one or more hardware resources as indicated by the catalogued hardware resource parameters. In the illustrated embodiment, instruction block 1 and instruction block 3 are grouped into execution group 1 because both instruction blocks make use of the integer unit during execution. Furthermore, instruction block 2 and instruction block 4 are grouped into execution group 2 because both instruction blocks make use of the branch unit during execution. By grouping instruction blocks that used the same or similar hardware resources together into execution groups, the virtualized destination code may be made more predictable relative to the virtualized source code. The decoder may reference the execution groups of a virtualized runtime thread during scheduling to predict what hardware resources will be used by the virtualized runtime thread. This information may be used to schedule the virtualized runtime thread to with a complimentary virtualized runtime thread the does not use the same hardware resources so that the threads may be executed concurrently on the same processor to improve processing efficiency.

Note in the above example, only the hardware resource parameter (e.g., integer, branch) most frequently used by the instruction blocks is shown in each summary. However, it will be appreciated that a summary may include a variety of different resource parameters that may be considered when forming execution groups and/or scheduling virtualized runtime threads.

Figure 3:
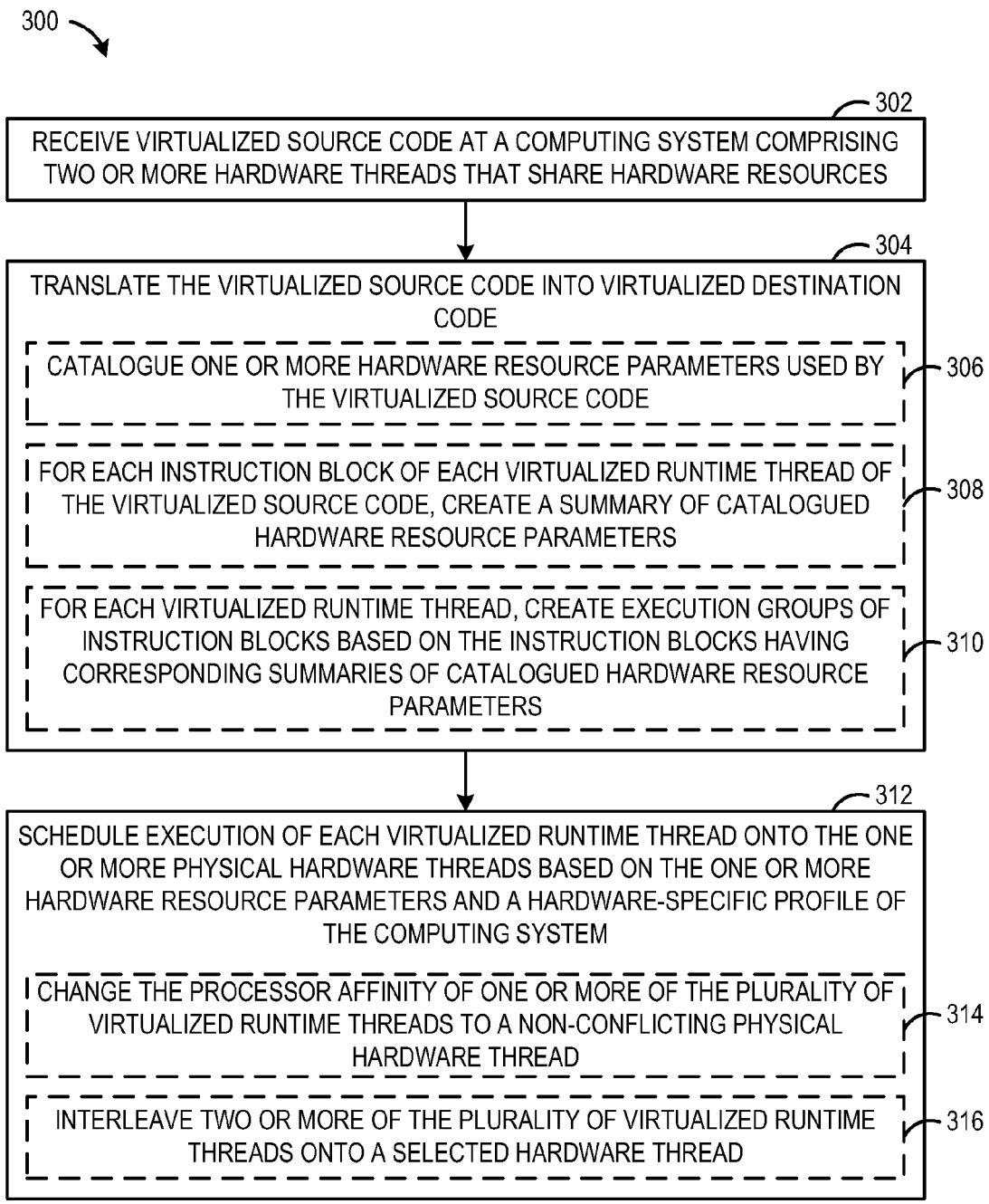
FIG. 3 is flow diagram of an embodiment of a method for scheduling execution of virtualized runtime threads onto one or more hardware threads that share hardware resources.

FIG. 3 is flow diagram of an embodiment of a method for scheduling execution of source code comprising a plurality of virtualized runtime threads onto one or more hardware threads of a computing system, which share hardware resources. The method 300 may be performed in a computing system such as computing system 100 shown in FIG. 1 to reduce the likelihood of virtualized runtime threads requesting the same shared hardware resources of a processor during the same time period in order to improve processing efficiency. The method may begin at 302, where the method may include receiving virtualized source code at a computing system comprising a plurality of hardware threads that share hardware resources, such as memory and/or execution units of a processor. In some embodiments, a decoder of a scheduler of the computing system may receive the virtualized source code, as described above.

At 304, the method may include translating the virtualized source code into virtualized destination code. The virtualized source code may be optimized for an undetermined hardware configuration that may not correspond to the hardware configuration of the computing system on which the virtual machine architecture is implemented. As such, virtual instructions of the virtual source code may be translated to physical instruction of destination code that corresponds to the hardware configuration of the computing system. The decoder may be configured to translate the virtualized source code into virtualized destination code.

During translation, at 306, the method may include cataloguing one or more hardware resource parameters used by the virtualized source code. The one or more hardware resource parameters may correspond to one or more of a floating point unit, an integer unit, a vector unit, and a branch unit, as described above. Furthermore, a hardware resource parameter may include virtually any suitable parameter that may be used to track use of hardware resources by the virtualized runtime threads. The catalogued hardware resource parameters may track whether or not a selected hardware resource is used by an instruction, an instruction block and/or a virtualized runtime thread. Further, the catalogued hardware resource parameters may track how much a selected hardware resource is used in an instruction block and/or a virtualized runtime thread. In some embodiments, the decoder may include a just-in-time compiler and/or an interpreter that may be configured to catalogue the hardware resource parameters.

At 308, the method may include for each instruction block of each virtualized runtime thread of the virtualized source code, creating a summary of catalogued hardware resource parameters. Each summary may indicate which hardware resources are used by the corresponding instruction block. The summaries may be created by decoder and may be used to optimize the virtualized destination code for execution on the computing system.

At 310, the method may include for each virtualized runtime thread, creating execution groups of instruction blocks based on the instruction block having corresponding summaries of catalogued hardware resource parameters. In other words, instruction blocks that use the same hardware resources may be grouped into execution groups in order to make execution of the virtualized runtime threads more predictable for scheduling purposes. The decoder 120 may organize the instruction blocks into execution groups as part of the translation from virtualized source code to virtualized destination code.

At 312, the method may include scheduling execution of each virtualized runtime thread onto one or more hardware threads based on the one or more hardware resource parameters and a hardware-specific profile of the computing system. A virtualization engine of the computing system may be configured to perform the scheduling. The virtualization engine may use the hardware-specific profile to see which hardware resources are shared by the hardware threads. This information may be used to find a suitable fit for scheduling of the virtualized runtime threads based on which hardware resource they use. The hardware-specific profile may include a model of performance characteristics of hardware resources used by the one or more hardware threads. The virtualization engine may use the performance characteristics to pair virtualized runtime threads on hardware threads that share hardware resources. In particular, virtualization engine may use the performance characteristics to predict when certain hardware resources may become available so that threads may be scheduled in to use the hardware resources in order to increase processing efficiency.

In some embodiments, at 314, scheduling may include changing a processor affinity of one or more of the plurality of virtualized runtime threads to a non-conflicting hardware thread. A thread affinitizer 138 of computing system 100 may be configured to change the affinity of the virtualized runtime threads. The thread affinitizer 138 may be implemented in computing system application where there is at least enough hardware threads to handle the execution of the virtualized runtime threads, such as in a computing system that includes a plurality of processor cores capable of performing concurrent multithreading via hardware threads that share hardware resources.

In some embodiments, at 316, scheduling includes interleaving two or more of the plurality of virtual runtime threads onto a selected hardware thread of the one or more hardware threads. A thread interleaver of the computing system may be configured to schedule execution of a plurality of virtual runtime threads by interleaving two or more of the plurality of virtual runtime threads onto a selected hardware thread of the one or more hardware threads. In particular, the thread interleaver may schedule a certain amount of one or more virtualized runtime thread on a particular hardware thread for execution and then may repeatedly switch the one or more virtualized runtime threads to different hardware threads as the virtualized destination code is executed.

The above described method may be performed to optimize virtualized source code for execution by a computing system comprising hardware threads that share hardware resources of a processor. By cataloguing hardware resource parameters used by virtualized runtime threads, execution groups may be created in the virtualized runtime threads that may make the virtualized runtime threads more predictable for scheduling. Moreover, virtualized runtime threads that use different hardware resources may be scheduled for concurrent execution on hardware threads that share hardware resources without causing bottlenecks in the processing pipeline of the processor.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A computing system comprising:
    a processor having a plurality of hardware threads that share hardware resources of the processor; and
    a scheduler configured to schedule execution of virtualized source code comprising a plurality of virtualized runtime threads, comprising:
    a decoder configured to catalogue one or more hardware resource parameters used by one or more virtualized runtime threads of the plurality of virtualized runtime threads and provide virtualized destination code including the plurality of virtualized runtime threads each having a plurality of instruction blocks organized based on the one or more hardware resource parameters used by the instruction blocks of each of the one or more virtualized runtime threads; and
        a virtualization engine configured to receive the virtualized destination code from the decoder and schedule execution of each of the plurality of virtualized runtime threads onto one or more selected hardware threads of the plurality of hardware threads based on the one or more hardware resource parameters and a hardware-specific profile of the computing system that defines performance characteristics of the processor and identifies the hardware resources that are shared between one or more of the plurality of hardware threads;
        wherein the decoder is configured to create summaries of catalogued hardware resource parameters for each of the instruction blocks, and to group the instruction blocks of each virtualized runtime thread into execution groups of instruction blocks that have corresponding summaries of the catalogued hardware resource parameters; and
        wherein the one or more hardware resource parameters corresponds to one or more of a floating point unit, an integer unit, a vector unit, and a branch unit.

2. The computing system of claim 1, wherein the decoder comprises a just-in-time compiler and/or an interpreter.

3. The computing system of claim 1, wherein the decoder is configured to group the instruction blocks of each virtualized runtime thread into execution groups of instruction blocks that have corresponding summaries of the catalogued hardware resource parameters, and the virtualization engine being configured to schedule execution of corresponding virtualized runtime threads such that virtualized runtime threads having execution groups that use the same hardware resources are not executed by hardware threads that share those same hardware resources.

4. The computing system of claim 1, wherein cataloguing includes determining that one or more selected hardware units are used by a selected virtualized runtime thread of the plurality of virtualized runtime threads.

5. The computing system of claim 1, wherein cataloguing includes determining a number of times one or more selected hardware units are used by a selected virtualized runtime thread of the plurality of virtualized runtime threads.

6. The computing system of claim 1, wherein cataloguing includes determining an amount or bandwidth of memory used to execute a selected virtualized runtime thread.

7. The computing system of claim 1, wherein the virtualization engine is configured to schedule execution of the plurality of virtualized runtime threads by changing a processor affinity of one or more of the plurality of virtualized runtime threads to a non-conflicting hardware thread of the plurality of hardware threads.

8. The computing system of claim 1, wherein the virtualization engine is configured to schedule execution of the plurality of virtual runtime threads by interleaving two or more of the plurality of virtual runtime threads onto a selected hardware thread of the plurality of hardware threads.

9. The computing system of claim 1, wherein the hardware-specific profile includes a model of performance characteristics of hardware resources used by the plurality of hardware threads.

10. The computing system of claim 9, wherein the hardware-specific profile includes hardware-specific execution times for instructions executed by the virtualized source code.

11. A method for scheduling execution of virtualized source code comprising a plurality of virtualized runtime threads onto a plurality of hardware threads sharing hardware resources of a processor of a computing system, the method comprising:
    cataloguing one or more hardware resource parameters used by one or more virtualized runtime threads of the plurality of virtualized runtime threads;
    translating the virtualized source code into virtualized destination code including the plurality of virtualized runtime threads having instruction blocks organized based on the one or more hardware resource parameters used by the instruction blocks of each of the one or more virtualized runtime threads;
    receiving the virtualized destination code from the decoder; and
    scheduling execution of each of the plurality of virtualized runtime threads onto one or more selected hardware threads of the plurality of hardware threads based on the one or more hardware resource parameters and a hardware-specific profile of the computing system that defines performance characteristics of the processor and identifies the hardware resources that are shared between one or more of the plurality of hardware threads;
    wherein scheduling includes creating summaries of catalogued hardware resource parameters for each of the instruction blocks, and grouping the instruction blocks of each virtualized runtime thread into execution groups of instruction blocks that have corresponding summaries of the catalogued hardware resource parameters; and
    wherein the one or more hardware resource parameters corresponds to one or more of a floating point unit, an integer unit, a vector unit, and a branch unit.

12. The method of claim 11, wherein cataloguing is performed by one or more of a just-in-time compiler and/or an interpreter.

13. The method of claim 11, wherein scheduling includes changing a processor affinity of one or more of the plurality of virtualized runtime threads to a non-conflicting hardware thread.

14. The method of claim 11, wherein scheduling includes interleaving two or more of the plurality of virtual runtime threads onto a selected hardware thread of the plurality of hardware threads.

15. The method of claim 11, wherein the hardware-specific profile includes a model of performance characteristics of hardware resources used by the one or more hardware threads.

16. A computing system comprising:
a processor having a plurality of hardware threads that share hardware resources of the processor; and
a scheduler configured to schedule execution of virtualized source code comprising a plurality of virtualized runtime threads, each of the plurality of virtualized runtime threads comprising a plurality of instruction blocks, comprising:
a decoder configured to catalogue one or more hardware resource parameters used by each instruction block of each virtualized runtime thread of the plurality of virtualized runtime threads, provide virtualized destination code including the plurality of virtualized runtime threads each having a plurality of instruction blocks organized based on the one or more hardware resource parameters used by the instruction blocks of each of the one or more virtualized runtime threads, create a summary of catalogued hardware resource parameters for each instruction block of the plurality of instruction blocks, and group the instruction blocks of each virtualized runtime thread into execution groups of instruction blocks that have corresponding summaries of the catalogued hardware resource parameters; and
a virtualization engine configured to receive the virtualized destination code from the decoder and to schedule execution of each of the plurality of virtualized runtime threads onto one or more selected hardware threads of the plurality of hardware threads based on the one or more hardware resource parameters and a hardware-specific profile of the computing system that defines performance characteristics of the processor and identifies the hardware resources that are shared between one or more of the plurality of hardware threads, such that virtualized runtime threads having execution groups that use the same hardware resources are not executed by hardware threads that share those same hardware resources;
wherein the one or more hardware resource parameters corresponds to one or more of a floating point unit, an integer unit, a vector unit, and a branch unit.

17. The system of claim 16, wherein the hardware-specific profile includes a model of performance characteristics of hardware resources used by the one or more hardware threads.

* * * * *